United States Patent [19]
La Casse et al.

[11] Patent Number: 5,877,254
[45] Date of Patent: Mar. 2, 1999

[54] SCRATCH-RESISTANT ANTI-FOG COATING COMPOSITION INCORPORATING ISOCYANATE-REACTIVE SURFACTANTS

[75] Inventors: Robert G. La Casse, North Plainfield; Walter S. Creasy, Bridgewater, both of N.J.

[73] Assignee: Film Specialties, Inc., Belle Mead, N.J.

[21] Appl. No.: 681,154

[22] Filed: Jul. 22, 1996

[51] Int. Cl.$^6$ .................. C08J 3/00; C08K 3/20; C08L 75/00; C09K 3/18
[52] U.S. Cl. ............ 524/590; 427/162; 427/372.2; 427/385.5; 523/169; 524/589
[58] Field of Search .................. 524/589, 590; 427/162, 372.2, 385.5; 523/169

[56] References Cited

U.S. PATENT DOCUMENTS

| | | | |
|---|---|---|---|
| 2,414,074 | 1/1947 | Vitalis | 106/13 |
| 3,022,178 | 2/1962 | Park et al. | 106/13 |
| 3,355,313 | 11/1967 | Eastes | 117/47 |
| 3,479,308 | 11/1969 | Gattenby et al. | 260/23 |
| 3,515,579 | 6/1970 | Shepherd et al. | 117/124 |
| 3,541,040 | 11/1970 | Eastes et al. | 260/31.6 |
| 3,542,713 | 11/1970 | Gillio-Tos et al. | 260/23 |
| 3,700,487 | 10/1972 | Crandon et al. | 117/72 |
| 3,781,238 | 12/1973 | Helm | 260/29.2 TN |
| 3,822,238 | 7/1974 | Blair et al. | 260/75 NK |
| 3,856,534 | 12/1974 | Fletcher et al. | 106/13 |
| 3,933,407 | 1/1976 | Tu et al. | 350/61 |
| 3,935,367 | 1/1976 | Merrill et al. | 428/336 |
| 4,080,476 | 3/1978 | Laskey | 428/413 |
| 4,144,377 | 3/1979 | Gallacher | 428/458 |
| 4,169,914 | 10/1979 | Gallacher | 428/290 |
| 4,239,878 | 12/1980 | Kobayashi et al. | 528/45 |
| 4,305,977 | 12/1981 | Kubitza et al. | 427/245 |
| 4,307,004 | 12/1981 | Schuhmacher et al. | 260/29.2 TN |
| 4,435,450 | 3/1984 | Coleman | 427/385.5 |
| 4,467,073 | 8/1984 | Creasy | 525/127 |
| 4,475,152 | 5/1988 | Fock et al. | 524/718 |
| 4,486,552 | 12/1984 | Niemann | 523/169 |
| 4,546,120 | 10/1985 | Peerman et al. | 521/159 |
| 4,551,484 | 11/1985 | Rädisch et al. | 523/169 |
| 4,604,425 | 8/1986 | Ohmura et al. | 525/88 |
| 4,609,688 | 9/1986 | Rädisch et al. | 523/169 |
| 4,642,267 | 2/1987 | Creasy et al. | 428/413 |
| 4,657,796 | 4/1987 | Musil et al. | 428/38 |
| 4,683,171 | 7/1987 | Kuga et al. | 428/354 |
| 4,705,721 | 11/1987 | Frisch et al. | 428/349 |
| 4,711,805 | 12/1987 | Helmer et al. | 428/323 |
| 4,742,100 | 5/1988 | Kay et al. | 524/238 |
| 4,749,586 | 6/1988 | Bravet et al. | 427/31 |
| 4,783,344 | 11/1988 | Bravet et al. | 427/31 |
| 4,835,194 | 5/1989 | Bright et al. | 523/169 |
| 4,855,384 | 8/1989 | Larson | 528/60 |
| 4,940,737 | 7/1990 | Braatz et al. | 521/103 |
| 4,945,149 | 7/1990 | Matsumoto et al. | 528/61 |
| 5,049,638 | 9/1991 | Matsumoto et al. | 528/61 |
| 5,104,959 | 4/1992 | Hess et al. | 156/99 |
| 5,116,442 | 5/1992 | Daude et al. | 156/99 |
| 5,180,760 | 1/1993 | Oshibe et al. | 523/169 |
| 5,262,475 | 11/1993 | Creasy | 525/58 |
| 5,277,944 | 1/1994 | Holzer et al. | 428/412 |
| 5,451,460 | 9/1995 | Lu et al. | 428/349 |
| 5,480,917 | 1/1996 | Kruger et al. | 522/33 |

*Primary Examiner*—Patrick D. Niland
*Attorney, Agent, or Firm*—Hoffmann & Baron, LLP

[57] ABSTRACT

Anti-fog and scratch resistant polyurethane compositions are disclosed which include an isocyanate prepolymer, a hydrophilic polyol and an isocyanate-reactive surfactant. The reaction product of the component produces enhanced properties having permanent anti-fog and scratch-resistant characteristics. These compositions may be used as coatings, films and self-supporting articles. Plastic substrates coated with these compositions may be subsequently subjected to thermoforming, such as molding and shaping, without loss of their properties.

13 Claims, No Drawings

SCRATCH-RESISTANT ANTI-FOG COATING COMPOSITION INCORPORATING ISOCYANATE-REACTIVE SURFACTANTS

FIELD OF THE INVENTION

The present invention is directed to polymer compositions which provide permanent anti-fog and scratch-resistant surfaces when cured. More particularly, the present invention involves polymer compositions having a hydrophilic polyurethane matrix which has a surfactant chemically reacted within its structure and attached as a pendent group to the polyurethane chain. The present invention provides a balance between excellent scratch-resistant properties and permanent anti-fog properties without resorting to the addition of hydrophilic alloy components which tend to compromise this balance by decreasing scratch resistance. Additionally, the polyurethane backbone of the hydrophilic matrix is rendered more hydrophilic by the incorporation of hydrophilic polyols which have chemically reacted with free isocyanate groups present in the polyurethane pre-reactant. These hydrophilic polyols increase the hydrophilicity of the polymer composition. Additionally, those surfactants useful in the present invention contain reactive functionalities which provide for incorporation into the polyurethane backbone via reaction with free isocyanate groups. The cured composition thus contains distinct hydrophilic moieties, as well as pendant surfactant moieties, the latter of which exhibit distinct hydrophilic and hydrophobic regions on a polyurethane backbone. By incorporating both hydrophilic groups and surfactant groups into the polymer backbone, the scratch-resistant properties can be maintained while simultaneously achieving excellent anti-fog properties. Thus, the present invention provides for the first time permanent anti-fog coatings by reacting surfactants with an hydrophilic polyurethane matrix.

BACKGROUND OF THE MENTION

Transparent films are being increasingly used as coatings for various glass and plastic articles, for instance, optical lenses, goggles, face shields, face plates for helmets, automobile windshields, and the like. Organic polymers, such as polyurethanes, are particularly useful in providing self-supporting surfaces or coatings for such applications, in that these transparent materials can provide high strength and improved abrasion resistance to the surface. Such organic polymers, however, have a high susceptibility to fogging on their surfaces, due to formation of droplets of water condensation, which simple wiping cannot adequately ameliorate. Additionally, in many applications, and particularly those contemplated herein, wiping the water droplets from the surface is not possible or practicable.

In order to prevent this fogging, it is known to use various surface active agents to provide anti-fog properties to such articles. For example, hydrophilic agents have been added to polyurethanes in order to impart anti-fog properties. U.S. Pat. Nos. 4,551,484 and 4,609,688 to Radisch et al., disclose anti-fog coating compositions for transparent surfaces which include a three-dimensional cross-linked polyurethane having a free surface active agent disposed within open domains in its cross-linked structure. The coating compositions are prepared by reacting isocyanates with polyfunctional polyols to obtain a polyurethane, and subsequently contacting the thus prepared polyurethane with a hydrophilic surface-active agent in order to diffuse molecules of the surface-active agent into the interior of the coating.

The surface-active agent, however, is not chemically reacted into the polyurethane, but is instead physically disposed within the polymeric structure. As such, the cured coating is susceptible to undesirable leaching and erosion of the surfactant, thereby decreasing the anti-fog properties of the coating composition.

It has also been proposed to react surface active agents into a polyurethane coating composition in order to impart anti-fog properties to the coating composition. For instance, U.S. Pat. No. 3,822,238 to Blair et al. discloses the addition of sulfonated "resins" to polyurethanes in order to prepare coatings with various properties including anti-fog characteristics. The resins are prepared from diols or diamines reacted with di-carboxylic acid esters, followed by sulfonation of double bonds or quarternization of amines. The resins are intended to increase the hydrophilic character and water absorption of the polyurethane coatings by reacting into the polyurethane backbone in an end-to-end fashion, rather than as pendent groups. Such resins which react in an end-to-end fashion, as opposed to remaining pendant at the end of the polyurethane chain, cannot provide for a clear delineation of hydrophilic and hydrophobic groups and in this respect do not behave as surfactants, i.e., they do not provide cooperation between distinct hydrophilic and hydrophobic portions to reduce interfacial tension.

U.S. Pat. No. 4,745,152 to Fock et al. discloses polyurethane compositions useful as coatings for transparent substrates with improved self-healing properties and prevention against formation of surface moisture. The polyurethane compositions are prepared from a reaction of an isocyanate with a polyol mixture including a difunctional sulfonated polyether polyol and a trifunctional polyol. Such a polyurethane composition incorporates only polyol combinations which impart hydrophilic character to the coating, and does not further incorporate into the composition a surfactant material.

None of the above-mentioned patents suggest or describe that their compositions may provide permanent fog resistance properties, i.e. fog resistant properties which last after repeated washings or extended soaking in water, nor do they teach or suggest that the effectiveness of their coatings can last more than a few hours of use.

Additionally, it is known to incorporate non-ionic surfactants containing reactive functional groups into polyurethanes prepared with polyvinylpyrrolidone as a hydrophilic agent. For example, U.S. Pat. No. 4,467,073 to Creasy discloses anti-fog coating compositions incorporating an isocyanate prepolymer which is reacted with a polyvinylpyrrolidone polymer, the reaction product thereof being subsequently reacted with a non-ionic surfactant having reactive groups for reacting with the isocyanate, for instance, hydroxyl reactive groups. Polyvinylpyrrolidone polymers, however, while serving to increase the hydrophilicity of the polyurethane matrix and improve anti-fog properties, also reduce the scratch-resistance, chemical resistance, water sensitivity, and durability of the cured polyurethane surface. Thus, although these compositions, when cured, have been known to provide anti-fog properties, their solvent sensitivity, flexibility and scratch resistance properties are less than desirable.

Thus, a need exists for a polyurethane composition which when cured provides enhanced chemical resistance and scratch resistance in addition to long lasting, permanent anti-fog properties and which are not easily susceptible to erosion or leaching out of the surfactant. The present invention provides such a composition by incorporating into the polyurethane backbone hydrophilic groups as well as pendent surfactant groups.

SUMMARY OF THE INVENTION

The present invention provides an improved scratch-resistant anti-fog polyurethane coating composition which incorporates into the polyurethane backbone a surfactant having distinct hydrophilic and hydrophobic regions to alter surface energy, as well as incorporating hydrophilic groups to increase the hydrophilicity of the polyurethane without substantially comprising its scratch resistance and chemical resistance. The coating composition includes an isocyanate prepolymer having free isocyanate groups, and an organic solvent solution of a hydrophilic polyol and a surfactant having isocyanate-reactive functionality. The hydrophilic polyol and the surfactant react with the free isocyanate groups in the isocyanate prepolymer to form the polyurethane backbone having both the hydrophilic moiety and the surfactant moiety chemically reacted therein and attached thereto. The surfactant must have distinct hydrophilic and hydrophobic regions such that the desired interfacial tension between the surface and the condensing moisture is effectively reduced. Thus, for purposes of this invention, the term "surfactant" will mean a reactive group-bearing surface-active agent having such distinct regions. Preferably, the reactive functionality on the surfactant will be a hydroxyl group.

The present invention also provides for a method of preparing a scratch-resistant anti-fog film substrate or coating composition. The method includes providing a mixture of an isocyanate prepolymer having free isocyanate reactive groups present therein and an organic solvent solution of a hydrophilic polyol and a reactive group-bearing surfactant, said surfactant having a distinct hydrophobic region and a distinct hydrophilic portion.

In another embodiment of the present invention, there is provided a polymer composition, which when cured exhibits anti-fog and scratch-resistant properties, the composition including the reaction product of a polyisocyanate prepolymer having reactive isocyanate groups, a hydrophilic polyol, and an hydroxyl-bearing surfactant having distinct hydrophobic and hydrophilic regions.

Although cationic and anionic surfactants are preferred, non-ionic surfactants are also useful in the present invention, provided they are equipped with the reactive group functionality and exhibit the distinct hydrophilic and hydrophobic regions.

A variety of hydrophilic polyols may be useful, but those preferred include polyethylene glycol, ethylene glycol/propylene glycol copolymers and mixtures thereof.

The isocyanate prepolymer is generally selected from the group consisting of biurets of diisocyanates, isocyanurates of diisocyanates and mixtures thereof.

The present compositions can be applied as a coating to a substrate surface and are sufficiently flexible to withstand further processing of the substrate, such as molding or shaping, without loss of its properties. A variety of substrates may be employed. Among the preferred substrate materials include polycarbonate, acrylic, polyvinylchloride, polybis-allyl carbonate, polyethylene terephthalate and polyethylene naphthenate transparent plastics. Various polyolefins, fluorinated polymers, metals and glass may also be used with appropriate pretreatments.

Alternatively, self-supporting films or articles can similarly be produced from the compositions of the present invention.

DETAILED DESCRIPTION OF THE INVENTION

The present invention is directed to scratch-resistant anti-fog coating compositions, methods for making the coating composition, as well as methods of rendering a surface scratch-resistant and imparting anti-fog properties. The coating composition includes an isocyanate prepolymer, a hydrophilic polyol and a hydroxyl bearing surfactant. The hydrophilic polyol and the hydroxyl-bearing surfactant react with free isocyanate groups in the isocyanate prepolymer to form a polyurethane backbone having the hydrophilic group of the polyol and the surfactant chemically reacted therein. Preferably, the surfactant attaches at the end of the polyurethane polymer. By properly choosing the hydrophilic polyol, the desired hydrophilic character can be imparted to the polyurethane. Moreover, by also carefully choosing the surfactant, the desired surfactant characteristics can be obtained. Thus, the final composition can be tailored such that in its cured state its anti-fog and scratch-resistant properties can be controlled through the careful selection of reactants.

Fog appears when moisture condenses on a hydrophobic surface and is drawn into tiny droplets that scatter light. It is contemplated that materials that are hydrophilic alone absorb condensed moisture. However, they become saturated quickly and result in poor anti-fog coatings. Modifying such hydrophilic materials with surfactants which include a domain of hydrophilic and hydrophobic segments causes condensate to spread, thereby maintaining clarity of a coated substrate.

In U.S. Pat. No. 4,467,073, anti-fog polyurethane coating compositions are prepared by reacting an isocyanate prepolymer with a polyvinylpyrrolidone and a non-ionic surfactant. Prior to the present invention, it was believed that anti-fog coatings prepared from polyurethanes through isocyanate reactions without polyvinylpyrrolidone would lead to a lower hydrophilicity in the coating composition, and therefore poor anti-fog characteristics. Polyvinylpyrrolidone has also been used in combination with crosslinked polyvinylalcohol to render compositions more hydrophilic, as described in U.S. Pat. No. 5,262,475. It has been unexpectedly discovered through the present invention, however, that such hydrophilicity can be maintained in a polyurethane coating composition without the use of polyvinylpyrrolidone, or other water soluble polymers by building into the polyurethane structure both hydrophilicity and surfactant properties.

As previously mentioned, non-ionic, cationic and anionic surfactants may be employed. In certain applications where non-ionics are used, they may be chosen from ethoxylated or propoxylated alcohols, phenols, amides and amines. Non-ionic surfactants, however, are known to typically include isocyanate reactive groups such as hydroxyl groups. To the contrary, anionic and cationic surfactants rarely contain free, reactive groups. The present inventors have found that when anionic and cationic surfactants are properly modified to include free reactive hydroxyl groups, or other groups which are reactive with isocyanate groups, such modifications will provide the necessary reaction site to incorporate into the polyurethane structure. Ionic surfactants are preferred because they are often more effective wetting agents than non-ionic surfactants due to their ionic character. In the present invention, the surfactant anionics are free to migrate throughout the polymer matrix since they are bound to the reacted cations by electrostatic interaction rather than covalent bonding.

The isocyanate-reactive surfactants of the present invention are preferably selected from the group consisting of anionic surfactants, cationic surfactants, and mixtures thereof. Although hydroxyl-bearing surfactants are preferred, a number of other reactive groups on the surfactant are contemplated, including amino, carboxyl and thiol groups. The surfactant may bear more than one or one-type of isocyanate-reactive group. The ionic surfactants are preferably quaternary cationic surfactants or anionic surfactants having hydroxyl groups in the cation portion. More preferably, the surfactant is a non-ethoxylated hydrocarbon chain with greater than 16 carbon atoms. A non-limiting list of examples of suitable anionic surfactants includes monoethanolamine salts of sulfonic acids, diethanolamine salts of sulfonic acids, triethanolamine salts of sulfonic acids and mixtures thereof.

Typically, anionic surfactants rarely contain free, reactive hydroxyl groups in their structure. As such, these substances must be prepared to incorporate free hydroxyl or other isocyanate-reactive groups. Hydroxylation is accomplished by neutralizing a hydroxyl bearing quartenary ammonium base such a choline hydroxide with an acid such as dodecylbenzene sulfonic acid, as further described herein in the examples. Other hydroxyl-bearing ammonium compounds include but are not limited to triethylethanol-, diethyldiethano-, and ethyltriethanolammonium salts. A non-limiting list of suitable sulfonic acids from which the salts are prepared includes dodecylbenzene sulfonic acid, napthalene sulfonic acid, lignin sulfonic acids, petroleum sulfonic acids and paraffin sulfonic acids.

Examples of hydroxyl-containing cationic-surfactants include, without limitation, ricinoleamidopropyl dimethylethylammonium ethosulfate, stearamidopropyl dimethylethanolammonium methasulfate and octadecylmethol diethanolammonium chloride.

The polyols in the present invention are of a hydrophilic character, and are capable of reacting with an isocyanate prepolymer to form a polyurethane chain. A non-limiting list of examples of suitable polyols for use in the present invention includes polyethylene glycol and ethylene glycol/propylene glycol copolymers and mixtures thereof. Other suitable hydrophilic polyols include polybutylene glycol, polyetheylene imine, amine-terminated polyethers and certain polyester polyols.

The isocyanate prepolymers contemplated for use with the present invention include those isocyanates containing reactive isocyanate groups and which are capable of forming polyurethane polymer chains as is well known to those skilled in the art. In preferred embodiments, the isocyanate prepolymer is a biuret or an isocyanurate of a diisocyanate. Most preferably, the diisocyanate is hexamethylene diisocyanate. Other useful diisocyanates include prepolymers of diisophorone diisocyanate, diphenylmethane diisocyanate, bis(methylcyclohexyl) diisocyanate and toluenediisocyanate. Blocking of the isocyanate group, for example with an oxime or phenol, and later removal of the protective group prior to reaction is also contemplated. When blocked isocyanates are employed, it is possible to use solvents or other compounds which, but for the protective group in the isocyanate, would react with and consume the isocyanate groups.

In the inventive method of forming compositions of the present invention, a polyisocyanate prepolymer having free isocyanate groups is mixed with an organic solvent solution of the hydrophilic polyol and the hydroxyl-bearing surfactant. The mixture is then allowed to heat cure at appropriate temperatures, e.g. between about 20° C. to and about 200° C. for a sufficient amount of time e.g., 5 minutes to 24 hours. Cure time and temperature will of course vary depending on the components and application.

A combination of hydrophilic polyols is preferred. For example, a polyethylene oxide/propylene oxide random triol having a molecular weight of about 4500 and containing approximately 70% ethylene oxide was combined with an ethylene oxide/propylene oxide block copolymer of molecular weight 2100 and containing about 20% ethylene oxide. Such a combination provides enhanced hydrophilicity to the polyurethane backbone without substantially compromising scratch-resistance or interfering with the incorporation of the surfactant.

The organic solvent used to prepare the solution of the hydrophilic polyol and the hydroxyl-bearing surfactant may be selected from a number of materials which do not react rapidly with isocyanates, including ketones, esters, glycol esters and tertiary alcohols. Minor amounts of inert diluents such as aliphatic hydrocarbons and esthers may be employed. Water and alcohols may be employed if commercially available blocked isocyanates are employed.

It has been unexpectedly discovered that combinations of reactive hydroxyl-bearing anionic and cationic surfactants provide synergistic effects with respect to their anti-fog properties as compared with the results of either of these surfactants when used alone at equivalent concentration. This is shown in Example 5 below. Additionally, when surfactants are used which do not react into the polymer matrix, they exude to the surface as oily, hazy residues which limit their utility to very low concentrations. In such compositions, the anti-fog properties erode quickly and render unacceptable surfaces for many commercial applications. In the present invention, the surfactant concentration can be much greater since these compounds are part of the polyurethane backbone. The surfactants may be used in concentrations of about 10% to about 40% by weight of total solids.

The hydrophilic polyol may be present in the composition in amount of about 10% to about 35% by weight of the total composition, and preferably about 15% to about 65%.

The invention can be illustrated in connection with the following examples, without limiting the scope of the claims attached hereto.

Preparation of Materials

Choline dodecylbenzene sulfonate was prepared by slowly adding 161.00 g (0.25 moles) dodecylbenzene sulfonic acid dissolved in 161 g cyclohexane to 67.32 g (0.25 moles) of a 45% solution of choline hydroxide in methanol at 0° C. The resulting solution was adjusted to pH 4.5 with additional sulfonic acid then evaporated to dryness at 45° C.

Tetramethylammonium dodecylbenzene sulfonate was prepared in a similar manner using 161.00 g of dodecylbenzene sulfonic acid with 91.15 g of tetramethylammonium hydroxide solution at 25% in methanol.

Ricinoleamidopropyl ethyldimonium ethosulfate and isostearamidopropyl ethyldimonium ethosulfate were purchased commercially as, respectively, Lipoquat R from Lipo Chemicals Inc. and Schercoquat IAS-LC from Scher Chemicals Inc.

Polyol A is a polyethylene oxide/propylene oxide random triol of molecular weight 4500 containing approximately 70% ethylene oxide.

Polyol B is an ethylene oxide/propylene oxide block copolymer of molecular weight 2100 containing approximately 20% ethylene oxide.

A polyol solution was prepared by combining 89.57 g diacetone alcohol, 10.40 g combined polyols A and B, 0. 03 g dibutyl tin dilaurate catalyst plus trace levels of flow aids to promote coating uniformity as is customary in the art.

After compounding with surfactants as described below, 100 g of the solution was mixed with 30 g hexamethylene diisocyanate biuret, 75% in xylene/butyl acetate (Desmodur N75, Bayer Corp.).

The mixed solution was applied to polycarbonate plastic lenses and cured in an oven at 125° C. for 30 min.

EXAMPLE 1

100 g of the above solution was compounded with 18.0 g choline dodecylbenzene sulfonate and 30 g of 75% hexamethylene diiscoyanate biuret. After curing the polycarbonate, the coating was clear, hard and abrasion resistant, and exhibited good resistance to fogging when placed over a container of hot (50° C.) water. Soaking in water degraded the fog resistance slightly, but even after 48 hours of immersion, only a light mist formed on the coated surface after 29 seconds of exposure. No visible deposit developed on the surface as a result of high humidity conditions and the abrasion resistance was unaffected. Surfactant did not exude from the coating surface even with concentrations as high as 30 g surfactant per 100 g polyol solution.

EXAMPLE 2

100 g of the above solution was compounded with 18 g of Ricinoleamidopropyl ethyldimonium ethosulfate, plus 30 g of 75% hexamethylene diisocyanate biuret. After curing on polycarbonate, the coating was clear, hard and abrasion resistant. The coated articles took approximately three times as long to fog as coatings containing no surfactant, even after soaking in water for 72 hours. There was no evidence of material exuding from the surface at any time during the experiment.

EXAMPLE 3

When a non-hydroxyl bearing cationic surfactant, such as isostearamidopropyl ethyldimonium ethosulfate was substituted for the surfactant in example 2, the initial anti-fogging behavior was excellent, but quickly degraded upon soaking in water, such that the time required for the coating to fog was approximately one half that of the coating in Example 2 after 72 hours. Also, the unreacted surfactant exudes from the surface as an oily, hazy film at concentrations as low as 0.60 g. At concentrations above 6 g per 100 g of polyol solution, the coating was cloudy and weak due to the large amount of unreacted liquid surfactant.

EXAMPLE 4

Substituting tetramethylammonium dodecylbenzene sulfonate in the polyol solution produced a coating that behaves like that in Example 3. This material was not capable of reaction with isocyanate groups, and therefore, exuded to the surface even when present at low concentrations, and coatings formulated with it lost their anti-fog properties when soaked in water. All other non-reactive surfactants evaluated produced similar results at concentrations well below 15 g per 100 g of polyol solution.

EXAMPLE 5

100 g of the polyol solution was compounded with 9 g choline dodecylbenzene sulfonate plus 9 g ricinoleamidopropyl ethyldimonium ethosulfate and 30 g of 75% hexamethylene diisocyanate biuret. After curing on polycarbonate, the coating was clear, hard and abrasion-resistant, and did not fog when placed over a container of hot (50° C.) water. Even after soaking in water for 72 hours, moisture condensing on the surface spread to a clear film. The combination of surfactants is definitely superior to an equal concentration of either material by itself.

EXAMPLE 6

A polyurethane film was prepared according to the directions given in U.S. Pat. No. 4,609,688. This material was immersed in an ethoxylated octyl alcohol containing 7 to 9 moles of epoxyethane per mole of alcohol for 2 hours at 80° C. Initially, the product resisted fogging very well, but this property was mostly or entirely lost after 8 hours immersion in water.

EXAMPLE 7

The procedure of Example 6 was repeated using an aqueous solution containing 30 wt % of linear C12 sodium sulfate (Texapon L-100, Henkel Corp.) Again, initial anti-fog performance was excellent but the property was quickly lost upon soaking in water.

While particular embodiments have been shown and described, various modifications will be apparent to those skilled in the art, and therefore it is not intended that the invention be limited to the disclosed embodiments or to details thereof, and departures may be made therefrom within the spirit and scope of the invention.

We claim:

1. A polymer composition which, when cured, provides a scratch-resistant, permanent anti-fog surface comprising:
   i) an isocyanate prepolymer having unreacted isocyanate groups; and
   ii) an organic solvent solution comprising a hydrophilic polyol compound and a surfactant comprising a non-ethoxylated hydrocarbon chain with greater than 16 carbon atoms containing an isocyanate-reactive group, said surfactant being selected from the group consisting of anionic surfactants, cationic surfactants and mixtures thereof, said surfactant having distinct hydrophobic and hydrophilic segments.

2. A composition as in claim 1, wherein said isocyanate-reactive group is selected from the group consisting of hydroxyl, amino, carboxyl and thiol functional groups.

3. A polymer composition which, when cured, provides a scratch-resistant, permanent anti-fog surface comprising:
   i) an isocyanate prepolymer having unreacted isocyanate groups; and
   ii) an organic solvent solution comprising a hydrophilic polyol compound and a surfactant containing an isocyanate-reactive group, said surfactant being selected from the group consisting of anionic surfactants, cationic surfactants and mixtures thereof, said surfactants having distinct hydrophobic and hydrophilic segments, wherein said isocyanate-reactive groups of said surfactant are positioned in a cation portion of said surfactant.

4. A composition as in claim 3, wherein said surfactant is selected from the group consisting of monoethanolamine salts of sulfonic acids, diethanolamine salts of sulfonic acids and triethanolamine salts of sulfonic acids and mixtures thereof.

5. A composition as in claim 4, wherein said sulfonic acids are selected from the group consisting of dodecylbenzene sulfonic acid, napthalene sulfonic acid, lignin sulfonic acids, petroleum sulfonic acids and paraffin sulfonic acids.

6. A composition as in claim 1, wherein said hydrophilic polyol is selected from the group consisting of polyethylene glycol and ethylene glycol/propylene glycol copolymers.

7. A composition as in claim 1, wherein said isocyanate prepolymer is selected from the group consisting of biurets of diisocyanates and isocyanurates of diisocyanates.

8. A composition as in claim 7, wherein said diisocyanate is hexamethylene diisocyanate biuret.

9. A composition as in claim 1, further including a catalyst.

10. A polyurethane composition comprising the reaction product of an isocyanate prepolymer, a hydrophilic polyol and a surfactant comprising a non-ethoxylated hydrocarbon chain with greater than 16 carbon atoms bearing an isocyanate reactive group selected from the group consisting of anionic surfactants, cationic surfactants and mixtures thereof, wherein said hydrophilic polyol and said surfactant react with isocyanate groups in said isocyanate prepolymer to form said polyurethane coating to provide a scratch-resistant and permanent anti-fog surface.

11. A method of providing an article with an anti-fog and anti-scratch surface comprising:

a) providing an isocyanate prepolymer having reactive isocyanate groups;

b) providing a reactive organic solvent solution comprising:

i) a hydrophilic polyol, and ii) a surfactant bearing an isocyanate-reactive group and having a distinct hydrophobic portion and a distinct hydrophilic portion, said surfactant being selected from the group consisting of anionic surfactants, cationic surfactants and mixtures thereof, said hydrophilic polyol and said surfactant being distinct components;

c) reacting said isocyanate prepolymer with said reactive organic solvent solution, wherein said hydrophilic polyol and said surfactant bearing said isocyanate reactive-group react with said isocyanate groups in said isocyanate prepolymer, thereby forming a polyurethane composition having pendent hydrophilic and surfactant groups chemically reacted therein; and d) applying said polyurethane to the surface of said article and heat curing.

12. A method as in claim 11, further including the step of thermoforming said article after said coating step d).

13. A polyurethane composition comprising the reaction product of an isocyanate prepolymer, a hydrophilic polyol and a surfactant bearing an isocyanate reactive group positioned in a cation portion of said surfactant, said surfactant being selected from the group consisting of anionic surfactants, cationic surfactants and mixtures thereof, wherein said hydrophilic polyol and said surfactant react with isocyanate groups in said isocyanate prepolymer to form said polyurethane coating to provide a scratch-resistant and permanent anti-fog surface.

* * * * *